Patented Mar. 2, 1943

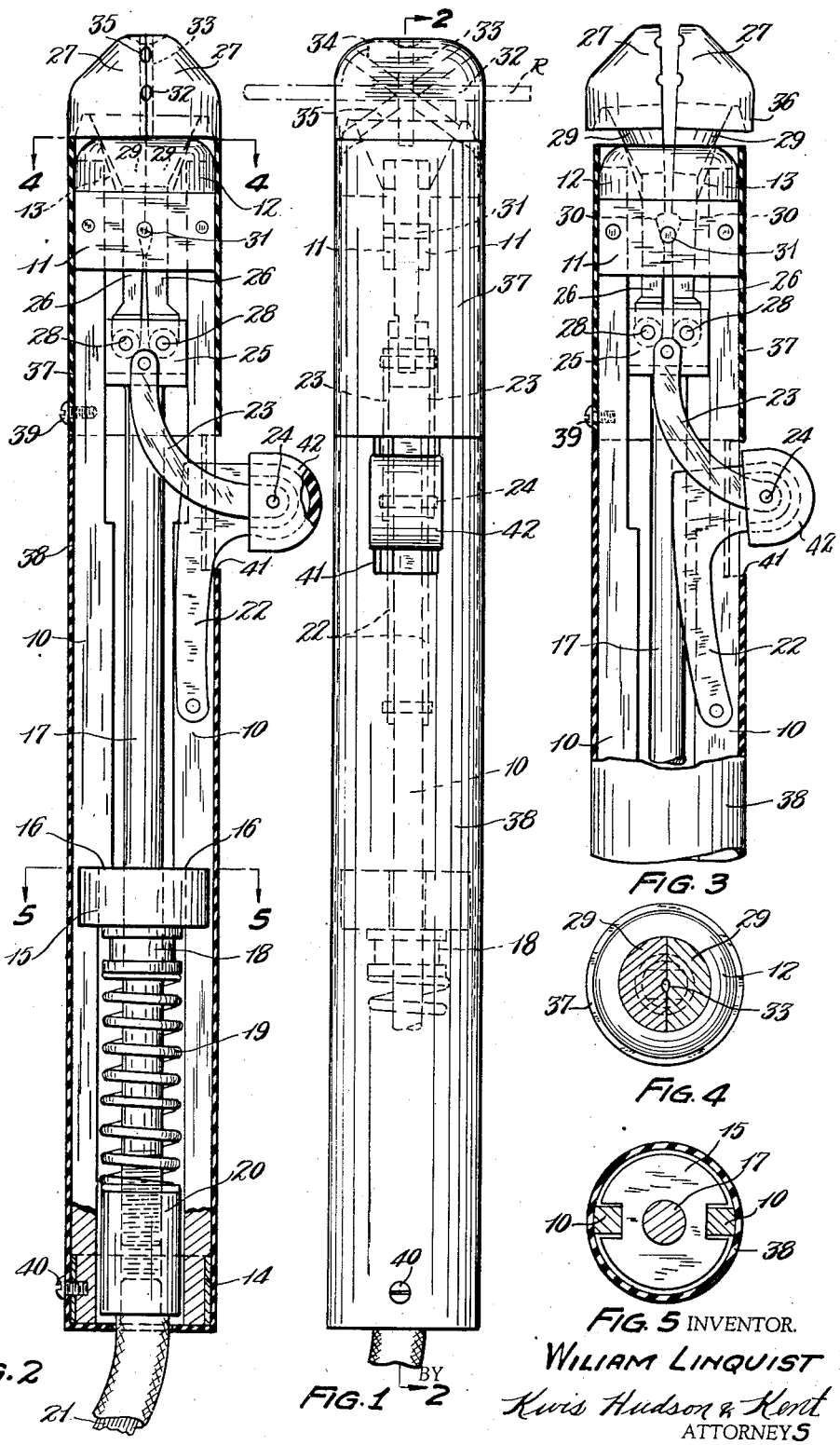

2,312,763

UNITED STATES PATENT OFFICE 2,312,763

WELDING ROD HOLDER

William Linquist, Cleveland, Ohio, assignor to A. L. Austin, Cleveland, Ohio, as trustee Application July 17, 1941, Serial No. 402,771

2 Claims. (Cl. 219—8)

This invention relates to improvements in welding rod holders, that is to say devices for grasping welding rods and functioning as holders or handles for convenient manipulation by the operator during welding operations. Such devices also, of course, serve to transmit electric current from a conductor to the welding rod.

One of the objects of the invention is the provision of means susceptible of easy manipulation for quickly clamping a rod in any one of various angles and permitting the shifting of the rod longitudinally at intervals as it is consumed, and with a minimum of effort.

Other objects and features of novelty will appear as I proceed with the description of that embodiment of the invention which, for the purposes of the present application, I have illustrated in the accompanying drawing, in which:

Fig. 1 is an elevational view of a welding rod holder embodying the invention;

Fig. 2 is an elevational view at right angles to Fig. 1, partly in section upon the line 2—2 of Fig. 1, the gripping jaws being in their closed position;

Fig. 3 is a fragmental view similar to Fig. 2 showing the clamping jaws in their open position; and Figs. 4 and 5 are cross-sectional views taken substantially on lines 4—4 and 5—5 of Fig. 2.

In the drawing I have illustrated a holder of elongated form, the major element of which is a body member extending the full length of the holder. In the illustrated embodiment this body member comprises two parallel bars 10 of identical form connected near one end of the holder by a pair of plates 11 and by a ring 12 with a central conical cavity 13. At their opposite ends the bars 10 are externally recessed to receive a cylindrical ring 14 to which they are secured by welding or otherwise.

Intermediate their ends the bars 10 carry an abutment collar 15 which is recessed to receive the bars, this collar bearing against shoulders 16 on the bars. Collar 15 has a central opening through which a plunger rod 17 slidably extends. A washer 18 surrounds the rod below collar 15 and forms a seat for one end of a coil spring 19, the opposite end of which engages a cylindrical block 20 that is threadably mounted upon the lower end of the rod. A flexible electric conductor 21 is electrically and mechanically joined to block 20, as by sweating. Spring 19, it will be observed, therefore tends to move the plunger toward the butt end of the holder and when the plunger moves the conductor 21 moves with it.

Movement of the plunger in the opposite direction is accomplished by means of a toggle lever comprising a link 22 bifurcated to straddle one of the bars 10 and a link formed of two identical pieces 23 connected by a pivot 24 to the opposite faces of link 22. The opposite extremities of the link pieces 23 are pivotally connected with opposite sides of a plunger head 25 which is preferably integral with the rod 17 and which slides between the bars 10. Obviously when the middle joint of the toggle, that is the joint around pivot 24 is pressed inwardly, the plunger 17 is moved endwise against the action of spring 19, and because of the mechanical advantage afforded by the toggle the actuation of the plunger requires little effort even though the spring 19 be a relatively strong one.

Two levers 26 provided at their outer ends with clamping jaws 27 are connected with plunger head 25 by pivots 28. These levers project through the space between plates 11 and through the conical opening 13 in ring 12. The jaws at the outer ends of the levers each have a semiconical portion 29 which contacts with the upper part of the conical opening 13 of ring 12. Consequently when the levers 26 are pulled inwardly by spring 19 the surfaces 29 engage the conical surface of opening 13 and direct the jaws 27 together.

Levers 26 are formed with small cam surfaces 30 surrounding a cavity in which is received a pin 31 that is mounted in the parallel plates 11 and bridges the space between them. When the levers 26 are forced outwardly by the actuation of the toggle lever the cam surfaces 30 running upon the sides of pin 31 spread the jaws 27 apart as in Fig. 3 of the drawing. The engaging surfaces of the jaws are provided with registering grooves forming two gripping channels 32 and 33 at right angles to each other and two crossed diagonal channels 34 and 35. A fragment of a welding rod is indicated at R in Fig. 1, being held by the channel 32 of the clamping jaws. The welding rod may, of course, be gripped in any one of the four channels and thus carried at the most advantageous angle for any particular piece of work. When the welding rod is gripped by the clamping jaws a good path for current is afforded from conductor 21 through the plunger and clamping levers and to some extent through the body member.

I prefer to provide each of the clamping jaws 27 with a skirt 36 which deflects sparks away from the interior of the tool.

The body of the device is protected by a cylindrical casing of insulation material constructed preferably in two parts 37 and 38 which may be secured to the body member by screws 39 and 40 respectively. The casing part 38 is cut out as indicated at 41 to permit the middle joint of the toggle lever to project outwardly so that it may be actuated by the operator, and an insulation cap 42 covers the joint, protects the operator from electric shock, and provides a thumb piece for his convenient use in opening the clamping jaws.

Having thus described my invention, what I claim is:

1. In a holder of the class described, an elongated body member, a casing of insulation material surrounding said body member, a plunger longitudinally movable within said body member, a pair of clamping jaws carried by said plunger projecting from one end of said body member, an electric conductor projecting through the opposite end of said body member and connected with said plunger, means for opening said jaws when moved in one direction longitudinally of the body member and closing them when moved in the opposite direction, a spring for moving the plunger in one direction and a toggle for moving it in the opposite direction, the middle joint of said toggle projecting outwardly through said body member and casing.

2. In a holder of the class described, an elongated body member, a casing of insulation material surrounding said body member, a plunger longitudinally movable within said body member, a pair of clamping jaws carried by said plunger projecting from one end of said body member, an electric conductor projecting through the opposite end of said body member and connected with said plunger, means for opening said jaws when moved in one direction longitudinally of the body member and closing them when moved in the opposite direction, a spring for moving the plunger in one direction and a toggle for moving it in the opposite direction, the middle joint of said toggle projecting outwardly through said body member and casing, and a cap of insulating material on said projecting middle joint for convenient actuation by the operator.

WILIAM LINQUIST.